United States Patent [19]

Pierrard et al.

[11] Patent Number: 4,816,150
[45] Date of Patent: Mar. 28, 1989

[54] FLAT FILTERING ELEMENT WITH A MEMBRANE FORMING A LAMELLAR FILTRATION CELL AND A TANGENTIAL FLOW PRESSURE FILTER INCLUDING STACKS OF SUCH ELEMENTS

[76] Inventors: Paul Pierrard, 199, chemin des Groux, 78670 Villennes/Seine; Michel Bernard, 2, place du Village, 78180 Montigny Le Bretonneux; Denis Largeteau, 13, allée des Tilleul, Maurepas, all of France

[21] Appl. No.: 39,263

[22] Filed: Apr. 17, 1987

[30] Foreign Application Priority Data

Apr. 22, 1986 [FR] France ............... 86 05765

[51] Int. Cl.$^4$ ............................................. B01D 13/00
[52] U.S. Cl. ................................. 210/321.82; 210/346
[58] Field of Search ............... 210/486, 346, 321.1, 210/321.2, 321.3, 433.2, 321.73, 321.82

[56] References Cited

U.S. PATENT DOCUMENTS

| 2,686,154 | 8/1954 | MacHeill | 210/321.73 |
| 3,494,468 | 2/1970 | Kuhl | 210/486 X |
| 3,579,441 | 5/1971 | Brown | 210/433.2 X |
| 4,261,830 | 4/1981 | Schael et al. | 210/321.3 |
| 4,500,426 | 2/1985 | Ishii et al. | 210/321.73 |

OTHER PUBLICATIONS

Ulmschheider et al., DEF. Pub. T 867,005, published 10-21-69.

Primary Examiner—Frank Spear
Attorney, Agent, or Firm—William A. Drucker

[57] ABSTRACT

Filtration module formed by a stack of tubular membranes shaped as flat cases (1) 0.2 to 2 mm thick and intercalated drains (2) formed as a cloth or a lattice which leaves uncovered the end parts of the case, which are covered by tight and rigid tongues (3). The stack, sandwiched between two rigid plates (5) and integrally mounted to two end flanges (6, 7) which sealingly engage a tubular body, while providing input openings (71) and output openings for the product to be filtered and the filtered product, in parallel for all the cases. The plates provide a free space for the filtrate discharge between the stack and the body. The path length of the filtered product is between 10 and 50 cm and the discharge path length of the filtrate is between 3 and 10 cm.

7 Claims, 4 Drawing Sheets

FLAT FILTERING ELEMENT WITH A MEMBRANE FORMING A LAMELLAR FILTRATION CELL AND A TANGENTIAL FLOW PRESSURE FILTER INCLUDING STACKS OF SUCH ELEMENTS

BACKGROUND OF THE INVENTION

1. Field of the Invention

The invention relates to microfiltration and to ultrafiltration using membranes subjected to a tangential flow.

The term microfiltration is usually applied to particle sizes of a suspension between a few hundredths of micrometers and a few tens of micrometers and is carried out for example at pressures between a few tens of bars and a few bars, whereas ultrafiltration aims at separating the large organic molecules from mineral molecules or from small organic molecules and takes place for example at pressures between 2 and 15 bars.

2. Description of the Prior Art

Causing the prefilt to flow at the surface of the membrane, (tangenetial flow), at speeds of the order of a few meters/second, ensures the permanent elimination of solids which tend to be deposited on the filtering surface, as well as the material inputs and renewals.

However, the efficiency of the known technique of tangential flow is not always satisfactory when it is considered for industrial applications, particularly for filtering liquids with a high solid material charge, even using a modular construction of the filter, that is to say forming it by a series and/or parallel assembly of modules each formed from a plurality of juxtaposed elementary cells, which allows the overall filtering surface to be obtained required for practical use by assembling together the relatively small surfaces of the elementary cells.

A sufficient yield of the membrane surface is in fact only obtained if a sufficient hydrodynamic homogeneity is provided, that is to say a good equal distribution both of the speeds and of the pressure gradients over the whole surface.

The known technique the most widely used in industrial tangential flow microfiltration uses a tubular mineral membrane formed of a rigid and porous mineral tube coated on the inside with an adjuvant film with ultrafine pores. Such elementary cells are assembled together in stacks so as to form a module. In order to obtain a large filtering surface for a given volume, a large number of practically contiguous tubes are grouped together in the stack, and the outlet for the filtrate from the central tubes is then braked by the resistance to the passage, so that a counterpressure is formed inside the corresponding cells, which adversely affects the hydrodynamic homogeneity, so the filtration yield.

The construction of such filters is moreover relatively expensive.

Other known types of elementary membrane filtering cells have either too great a thickness of the liquid stream flowing over the membrane (whence an insufficient speed gradient), or a linking up path for the filtered product which is tortuous and long and generates pressure losses which act counter pressurewise (impeding draining of the filtrate), or an inner lining of the membrane (inter membrane cloth) which also induces high pressure drops, or finally mechanical fragility.

By way of example, the membranes formed of a non woven textile web coated or impregnated with polymers present impeding draining of the filtrate and their open cellular structure leads to the irreversible trapping of the particles, the "sieve" membranes (polymer film which is subjected to bombardment with heavy ions) have a thickness limited to 10 $\mu$, which makes use thereof difficult; finally, the ultrafiltration membranes of the composition multilayer type have an active layer with toruous structure in which irreversible inclusions of particles may occur.

Depending both on the known structures of modules (with hollow fibers, tubular, spiral or flat) and on the types of membrane used by different coefficients of worth are obtained, which take into account the pressure drops in the filtrate or the concentrate, the energy consumption, the possibility of treating charged liquids, the ease of thickness adaptation. An important factor is also formed by the "dead" volume per square meter of membrane in the module, that is to say the volume which it is necessary to set in motion in order to obtain the efficient speed: the lower this volume, the greater will be the energy performance of the module.

SUMMARY OF THE INVENTION

The invention provides then a membrane filtration cell which has, with respect to known cells and, in particular, to those mentioned above, the advantages of having at the same time a small thickness of the liquid stream (0.3 to 2 mm) and a limited length of the path of the liquid to be filtered (10 to 50 cm), non impeding draining of the filtrate, so a short discharge path (3 to 10 cm), the absence of intermembrane lining, a structure having sufficient mechanical strength for it to keep a constant geometry, guaranteeing the stability of the hydrodynamic conditions, under pressure and temperature constraints and a satisfactory constructional cost.

The low thickness of the liquid stream allows high speed gradients to be obtained for relatively low flow speeds. The limited length of the path of the filtered product avoids concentration of gradients which are too high and thus ensures rehomogeneization of the filtered product.

It also provides a structure for the module having a non impeding distributing of the intakes and a low dead volume per m$^2$ of membrane (0.15 to 0.45).

The elementary membrane filtration cell of the invention is formed by a membrane having one or two flat sheets and shaped as an ultraflat elongate case open at both its ends, said case, without inner lining being sandwiched between two flat cloths or lattices integral or not with the membrane forming a drain of given texture for supporting the membrane without deformation of its inherent flatness under the effect of the pressure and so as to give it good dimensional stability under mechanical, thermal or chemical stresses with a geometry such that it ensures non impeding discharge of the filtrate, said drains not overlapping the end portions of the two faces of the membrane, being extended at each end by tight and rigid end tongues of the same thickness as the drain and which overlap said end portions.

The filtration module of the invention is formed by a direct stack of geometrically cylindrical elementary cells, housed inside an elongate housing which itself has the end orifices required for the inlet and outlet of the product to be filtered and the side outlet orifice or orifices for the filter, said cells being assembled together by fixing end tongues to the membranes, said stack being sandwiched between two rigid sides and the assembly being secured to two end flanges respectively provided with an inlet window and an outlet window for the product to be filtered through the respective ends of said cases and mounted inside said housing against which the two flanges are sealingly applied.

In a preferred embodiment, said sides are themselves connected mechanically to the inner wall of said envelope so as to reinforce the rigidity of said stack.

BRIEF DESCRIPTION OF THE DRAWINGS

Other features and advantages of the invention will be clear from the following description, with reference to the accompanying drawings in which.

DESCRIPTION OF THE PREFERRED EMBODIMENTS

Figure 1:
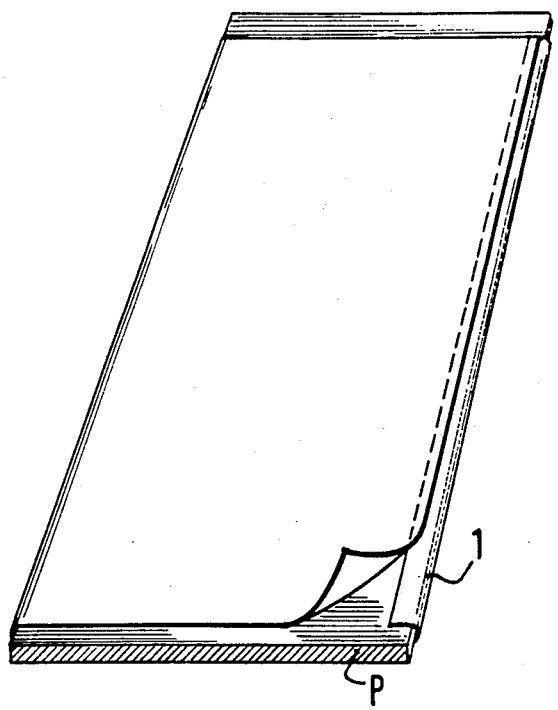
FIG. 1 illustrates one embodiment of the case formed by the membrane.

FIG. 1 shows that the membrane 1, in the form of a flat sheet made from copolymer or from a metal of a thickness between a few micrometers and a few hundred micrometers, is cut to the desired format, then wound about a "service plate" P whose dimensions are such that they define the future geometry of the fluid stream. After covering the two edges of the membrane, they are secured so as to form a flat case having for example a thickness of 200 $\mu$ to 2 mm and two faces each having an area going from a few tens to a few thousand centimeters squared.

In a variant, the case could be obtained by juxtaposing two flat sheets assembled laterally together, with or without sealing inserts, or from an homogenous tube.

Figure 2:
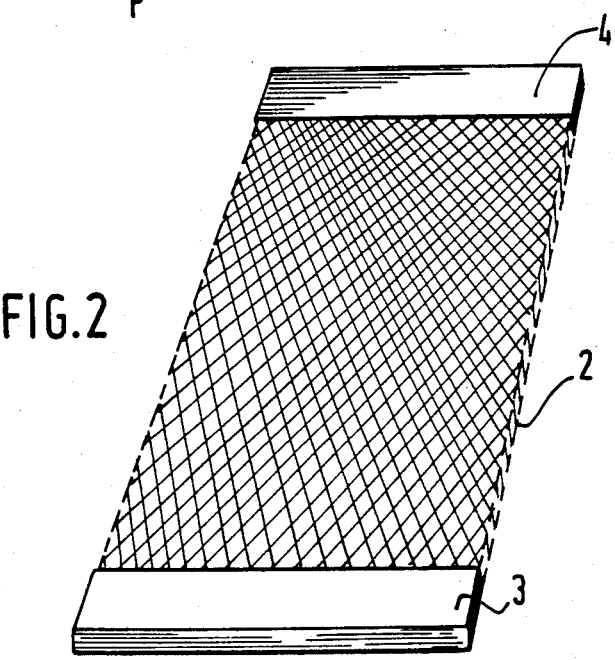
FIG. 2 shows a drain, with its two end tongues.

FIG. 2 shows a flat drain 2 formed of a cloth, lattice, or similar whose texture is such that it provides the best compromise for satisfying the following functions:

support for the membrane: no deformation of the inherent flatness of the membrane under the effect of the pressure, no alteration of its integrity,
compactness: small thickness 0.2 to 2mm for example,
low pressure loss in the through flow of the filtrate,
dimensional stability under the different mechanical, thermal and chemical stresses.

The constituent materials of the drain may be: plastic polymers and copolymers, glass, metals, carbon or any other appropriate materials.

The end tongues 3 and 4 which, in the preferred version, are not connected to the drain, fulfill the following functions:

closing the drain in its thickness so as to prevent this latter from being penetrated by the fluid to be treated,
avoiding the mixture of the two circuits by securing to the membrane and, preferably, to the end flanges,
defining the geometry of the inlet and discharge orifices for the treated fluid and maintaining the hydrodynamic conditions imposed through its rigidity and its anchorage in the end flanges.

The materials forming these tongues may be plastic polymers, copolymers, composites reinforced with fibers or fabrics of all kinds, glass, metals, carbon, ceramics or any other appropriate materials.

These materials are such that they provide the tongues with mechanical rigidity, in particular low flexion and low expansion coefficient.

Figure 4:
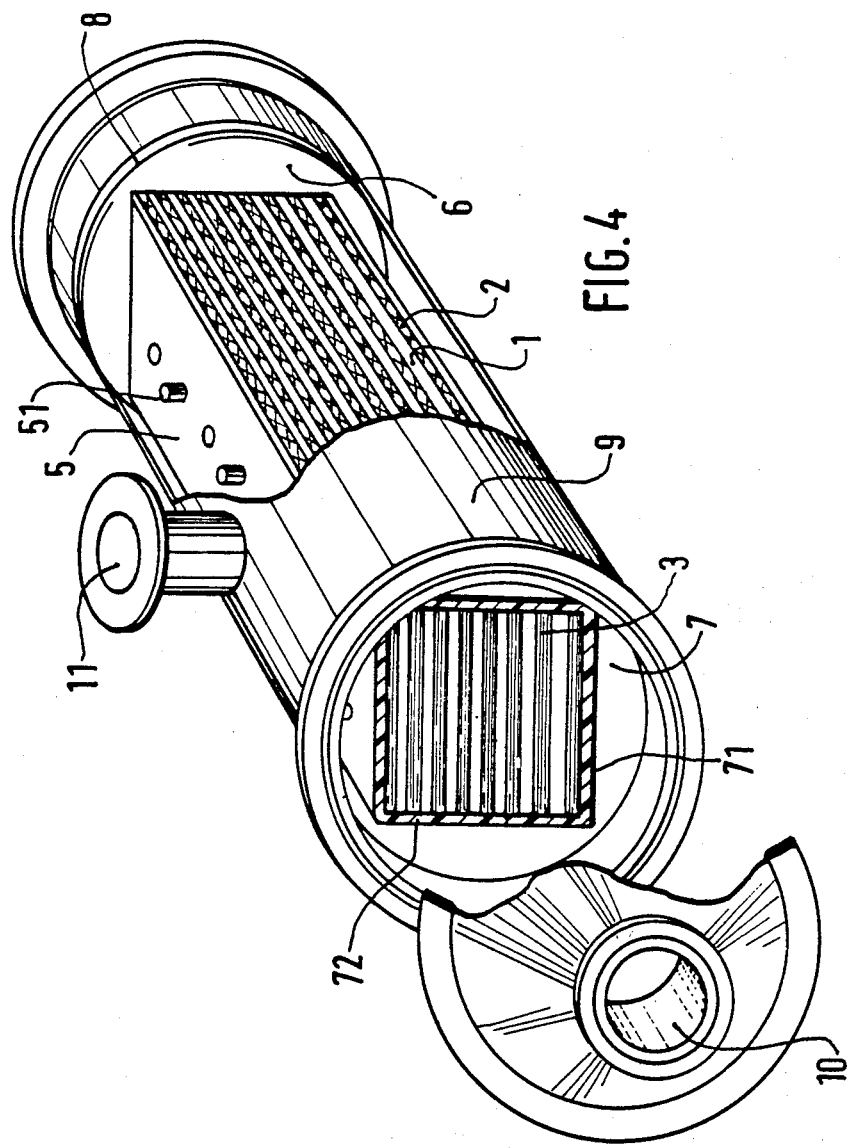
FIG. 4 is a perspective view of a complete module mounted in a housing.
Figure 5:
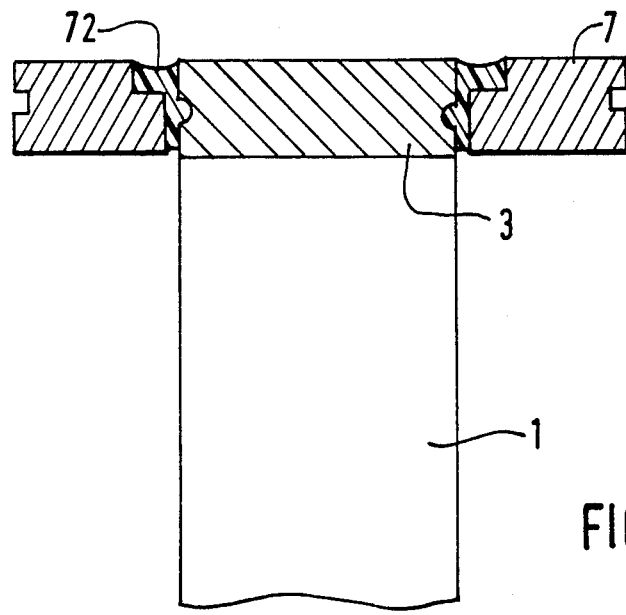
FIG. 5 illustrates the anchorage of the tongues which extend the drain in an end flange of the module.

Furthermore, these tongues are anchored in the end flanges by means of an appropriate elastomer seal (72 FIGS. 4 and 5) which absorbs the deformations due to the temperature and the pressure, in the longitudinal and transverse directions.

Figure 3:
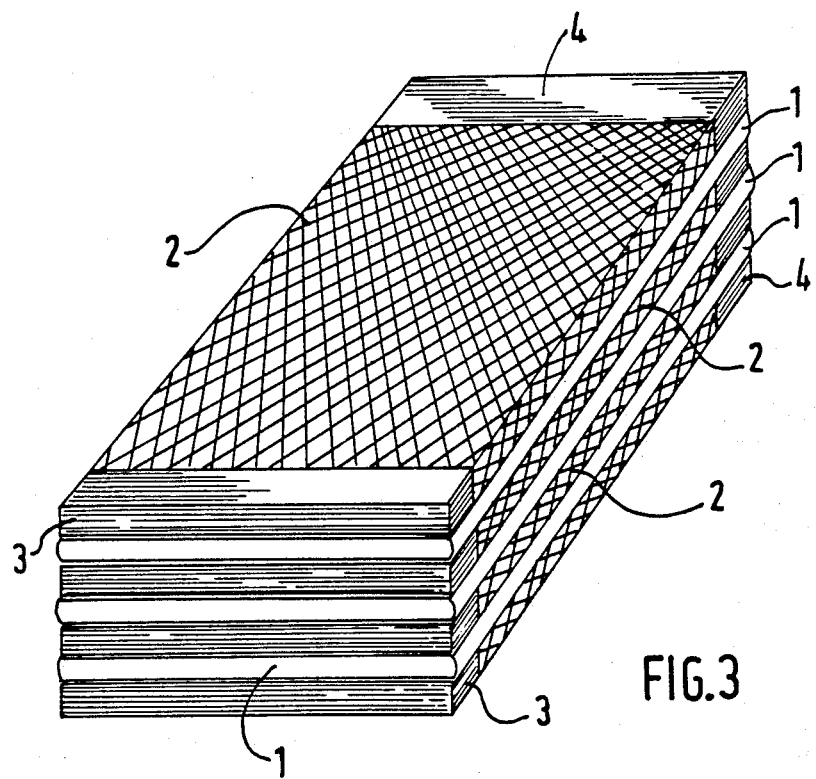
FIG. 3 shows the stack of several cases with the insert drains and the end tongues which extend them.

The unit assembly: drain, end tongues and membrane still having the service plates, is assembled by stacking; during this operation the membranes (FIG. 3) are secured to the tongues over the whole surface thereof.

The membrane-drain-tongue stack, held on its two sides by two plates 5-6 (FIG. 4) is then secured to two end flanges 7-8 by means of seal 72 and the service plates are removed from the membranes. The module thus formed is introduced into a tubular housing 9 having at its ends the orifices required for the inlet 10 and the outlet of the product to be filtered and, laterally, orifices 11 for the outgoing filtrate.

Plates 5 and 6 are dimensioned so as to withstand the pressure difference between the liquid to be filtered and the filtrate. Cylindrical pins 51, integral with these plates, bear on the inner wall of the housing and thus reinforce the rigidity of the assembly.

The circular flanges 7 and 8 are provided with seals which provide sealing between the two circuits of the product to be filtered and the filtrate, and with windows 71 enclosing the inlet and outlet zones of the lamellar channels formed by the cases.

The rigidity of the end tongues, the homogeneity of the geometry of the inlet and outlet orifices and the sufficiently small exchange area formed by each of these channels ensures the equal distribution of the speeds of the tangential flow of the product to be filtered and of the pressure differences at the different points of this surface.

It will be noted that the pressure losses at the inlet and at the outlet of the product to be filtered are very low, the admission and the discharge being direct, and that the dead volume per unit of area of the membrane is particularly reduced.

Figure 6:
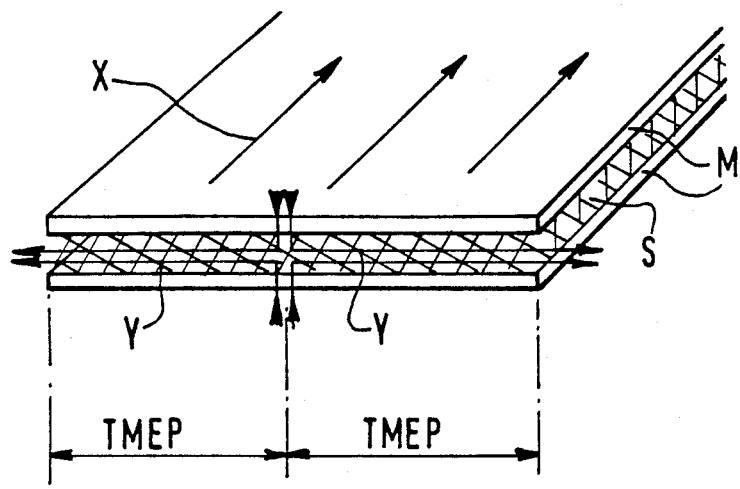
FIG. 6 shows the discharge path for the filtrate.

FIG. 6 shows the maximum mean path of the filtrate (TMEP). The arrows X show the flow direction of the liquid to be filtered Y that of the filtrate, S designating the drain and M the membranes.

It goes without saying that different modifications may be made to the example described, without departing from the scope and spirit of the invention.

What is claimed is:

1. A filtration module formed by a stack of flat elongate tubular membranes opening at both ends and forming a fully opened feed fluid passage, said membranes being of substantially identical upperforated surfaces and alternating with flat permeable insert elements, said track being housed in a housing having an elongate tubular body closed by two end walls with inlet and outlet openings provided in said end walls for the product to be filtered which flows on the surface in the tubular membranes, the body being provided with discharge orifices for the filtrate which passes through the insert elements, in order to provide microfiltration with a tangential flow of the feed fluid to be filtered generating high flow speed gradients, for flow speeds of a few m/sec., a short linking path of the filtrate, a reduced dead volume per m2 of membrane and non impeding draining of the filtrate, each tubular membrane forming a case having a thickness between 0.2 and 2 mm for an area between a few tens and a few thousands cm2, each insert element being a drain formed by a porous cloth or lattice of predetermined texture for supporting the membrane without deformation of its inherent flatness under the effect of the pressure while providing therefor good dimensional stability under the mechanical, thermal and chemical stresses, said drain continuously and uniformly engaging and covering the two outer faces of the membrane to the exclusion of the end portions of said outer faces, tight and rigid tongues extending the drain at both ends thereof and of the same thickness as said drain, said tongues covering said end face portions, said inlet and outlet openings being dimensioned so as to provide the simultaneous inlet of the feed product into the respective membranes of the stack and its simultaneous outlet from the stack of membranes which are thus placed in parallel in the module, the stack being sandwiched between two rigid plates applied to the faces of the end membranes of the stack and means being provided for fixing the stack inside the body of the housing while providing about the stack a free space for discharge of the filtrate between the stack and the body of the housing in a direction substantially at right angles with the membrane faces.

2. The filtration module as claimed in claim 1, wherein the side edges of the cases are in direct contact with said free space.

3. The filtration module as claimed in claim 1, wherein the stack with its rigid side plates is fixed to two end flanges applied sealingly against the body of the housing and providing windows covering all the end surfaces of the stack.

4. The filtration module as claimed in claim 1, wherein said side plates are connected by rigid spacers (51) to the inner wall of said body.

5. The filtration module as claimed in claim 1, wherein said discharge path for the filtrate is between 3 and 10 cm.

6. The filtration module as claimed in claim 1, wherein said path for the feed product is between 10 and 50 cm, whereas the path for the filtrate is between 3 to 10 cm.

7. The filtration module as claimed in claim 1, wherein the drain thickness is between 0.2 and 2 mm

* * * * *